March 23, 1965 R. C. MOTT 3,174,499
PNEUMATIC CONTROL DEVICE
Filed Nov. 8, 1961
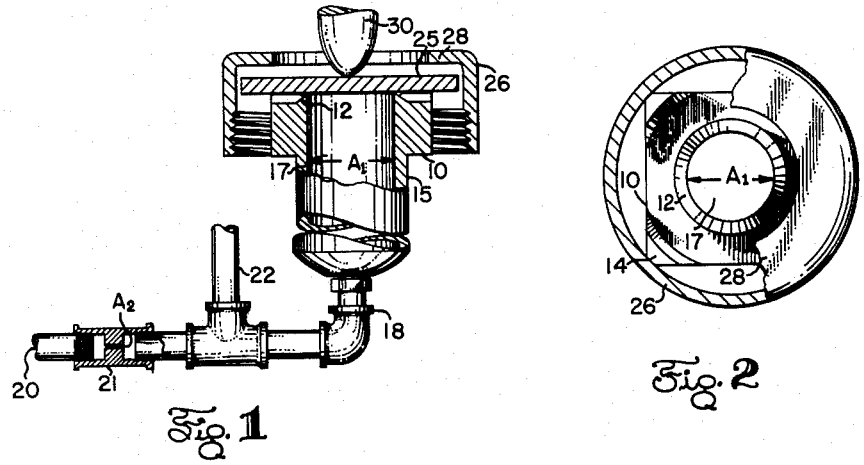
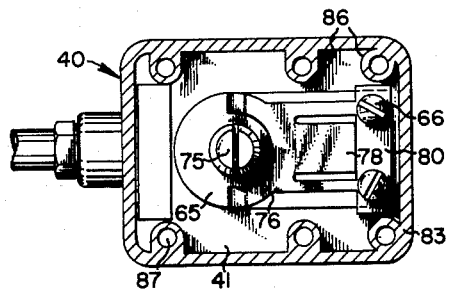
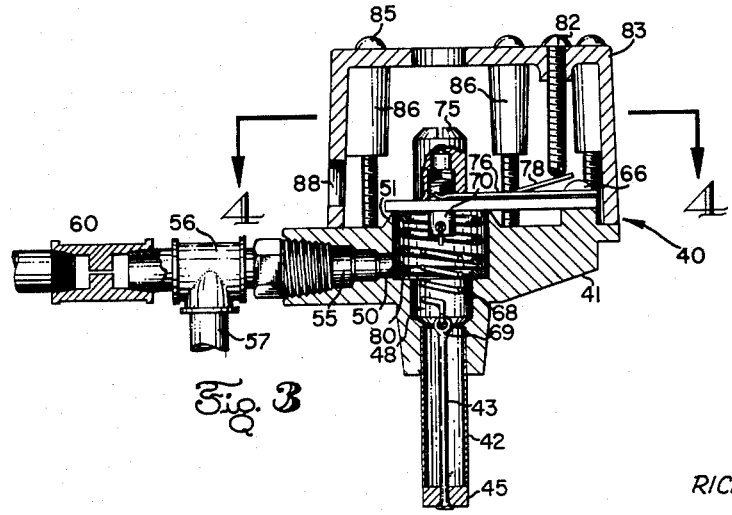
INVENTOR.
RICHARD C. MOTT
BY Joseph E. Ryan
ATTORNEY United States Patent Office 3,174,499
Patented Mar. 23, 1965

3,174,499
PNEUMATIC CONTROL DEVICE
Richard C. Mott, Harwood Heights, Ill., assignor to Honeywell Inc., a corporation of Delaware
Filed Nov. 8, 1961, Ser. No. 151,087
3 Claims. (Cl. 137—82)

This improved pneumatic control device or valving arrangement is applicable to many types of pneumatic controllers and utilizes a wide area nozzle with a flapper or valve closure member and a restriction in the supply of relatively small diameter or area to produce a force under the valve closure member in opposition to the input signal or force which is of significant magnitude and is proportional to the closing force to effect a force balance type of operation and a force feedback on the input signal to provide an improved stabilized pneumatic control. It is therefore an object of this invention to provide an improved pneumatic control device with feedback operation. It is also an object of this invention to provide an improved pneumatic control which lends itself to high force input mechanisms and yet is simple in design and cost, and requires no special maintenance. These and other objects of this invention will become apparent from reading the attached description together with the drawings wherein:

FIGURE 1 is a side elevation view in section of the improved nozzle valve closure configuration utilizing the present invention, FIGURE 2 is a plan view of the apparatus shown in FIGURE 1, FIGURE 3 is a side elevation view in section of the principle of the invention applied to a rod and tube type sensing element, and FIGURE 4 is a plan view in section of the device shown in FIGURE 3.

The improved nozzle valve closure arrangement or apparatus shown in FIGURES 1 and 2 represents one form this apparatus may take. It is shown as encompassing a valve body member indicated generally at 10 which terminates in a wide area or large diameter nozzle at one periphery, the nozzle having an area dimension A–1 and being defined by a raised ridge 12. The body 10 is shown as generally square in cross-section and employing a second outer concentric ridge 14, the two ridges being at the same level or elevation from the body and being lapped or ground to an exact dimension. The body 10 includes a shoulder portion 15 slightly recessed from the main body with a conduit 17 extending therefrom which is of the same diameter or cross-sectional area as the nozzle.

The apparatus shown in FIGURES 1 and 2 is normally included in condition controllers providing means for supplying input movements thereto. In addition, they would include connections to an air supply since the device is basically on a one pipe bleed type. Thus in FIGURE 1, the conduit 15 is shown as connected to a remotely positioned conduit 18 which may or may not be part of the device which is connected to a power supply conduit indicated generally at 20 and including a restriction 21 having a diametrical dimension or cross-sectional area indicated at A–2. The cross-sectional area, as will be later noted, will bear a definite relationship or ratio to the cross-sectional area of the nozzle to provide the force balance relationship upon the valve closure member to be later described with the restriction connected to the supply pipe 20 included as part of the system device which may be included as part of a device. Provision is also made, as shown schematically, for taking a pneumatic pressure signal from the valving arrangement through a conduit indicated at 22 or outlet conduit which normally is also remote from the control device, particularly if it is of the one pipe type but will be included therein if the restriction is located in the device. Associated with the nozzle 11 and contacting the ridges 12 and 14 is a valve closure member shown in FIGURE 1 as a cylindrical disc 25 which disc may be made of any suitable material and is ground or lapped to fit smoothly and accurately with the ridges 12 and 14 for positive close off. FIGURE 1 also shows a retaining ring 26 which is threaded on or suitably secured to the nozzle body 10. The ring has a flange portion 28 designed to retain the disc 25 on the nozzle and being suitably spaced from the nozzle body so as to allow limited movement of the valve closure member or disc 25. The retainer 26 is also open beyond the flange section 28 to provide for input movements to the same or forces to be applied to the disc from an external device such as might be imparted from a thrust member indicated generally at 30.

The large area nozzle used in the improved pneumatic control valving arrangement herein compared with the restriction area provides a force feedback on the valve closure member to reduce the travel of the valve closure member and provide a force balance type of operation as distinguished from a position balance type of operation. An increase in force is required to operate the controller making it applicable to high force input mechanisms. However, the branch line pressure established in the nozzle by the relative positioning of the valve closure member with the nozzle will act on the undersurface of the valve closure member and since this surface is of sufficient magnitude because of the large nozzle will provide a force in opposition to the input force applied to the device. Thus, it provides an ideal coupling arrangement for a high force low motion input and because of the simplicity in structure permits a low cost pneumatic control of this type. The relative areas of the nozzle and restriction which restrict the flow of the apparatus relative to the nozzle and make outlet or branch pressure effective to provide the feedback which is considerably higher than conventional pneumatic relays. The ratio of these areas will be from 150 to 1 and larger, with a ratio as low as 100 to 1 being effective to provide a feedback operation to provide a distinction between a force balance and a position balance type of operation. Normally these ratios are considerable, being in the ratio of 1000–5000 to 1. Thus, for a ½ to ¾ inch diameter nozzle, a .007 inch restriction would be used in the improved apparatus with an applied supply pressure of 0 to 15 p.s.i. Thus, the improved apparatus is independent of main line pressure change and the relative movements required to produce an effective outlet pressure change from the supply are in the order of .005 to .010 of an inch. The forces required to operate the apparatus may be readily calculated from the formula $F=$ pressure times area where the pressure would normally vary from the slight reduction of the 15 lbs. down to zero and the area would vary depending upon the diameter of the orifice. Thus, for example, with a ½ inch orifice, and a 10 lb. branch pressure the input force required would be about 2 lbs.

The application of this improved pneumatic control principle is shown in one application in FIGURES 3 and 4 as a rod and tube type thermostat or sensor with the nozzle valve closure member built into the same. In this application, the valve closure member instead of being a floating disc is a flexible plate which is pivoted or movable in response to an input force. The rod and tube sensor is shown generally at 40 as having a body portion 41 to which is attached the tube 42 and rod 43, the tube having a closure or plug 45 to which the rod 43 is attached and secured at one extremity. The free end of the rod extends into an input conduit 48 terminating in a nozzle section 50 of the body 41 which section has a single raised ridge 51 defining the nozzle. Communicating with this nozzle is an inlet pressure conduit 55 to which is connected, as shown schematically, an external piping 56 with a branch line conduit 57 leading therefrom and with the inlet conduit including on the upstream side of the branch conduit 57 a restriction 60 which has a predetermined diameter for giving a cross-sectional area. The valve closure member in this embodiment is the flexible plate shown at 65 which is secured to the body 41 through suitable means such as screws 66 with the plate extending over the ridge 51 or the nozzle. These parts, that is the undersurface of the plate 65 and the nozzle 51 are lapped or ground for proper mating purposes. The rod 43 is attached to the plate 65 through a spring indicated at 68 one end of which is connected through a suitable connecting portion 69 of the rod and at the other extremity is attached to an adjustable pin 70 having a threaded periphery by means of which it is held on or connected to the upper surface of a plate 65 through an adjusting screw 75. Overlying the plate 65 as will be seen in FIGURE 4 is a bifurcated spring member 76 which has a tongue portion or adjustment flange 78 and a mounting section which is positioned under and secured by the screws 66 to the base. In addition to the spring 68 connecting the rod to the plate 65 and the adjusting spring 76 positioned above the plate and applying a bias to the same, the rod and tube sensor includes a compression spring 80 which is utilized to convert the input force from the rod and tube sensor in the proper input direction to the flapper or valve closure and nozzle arrangement. Thus the compression spring 80 is positoned in the nozzle section 50 and engages plate 65 on the undersurface thereof to apply an opening force to the flexible plate which has a relatively limited range of movement relative to the nozzle 51. The rod and tube sensor will apply a tension force to the plate 65 in opposition to the compression spring or in a closing direction and variation in the length of the rod 43 with respect to the tube 42 and will change the bias on the spring 68 acting against the compression spring to vary the force on the plate or valve closure member 65 in accordance with the condition sensed by the rod and tube sensor. Setting of the sensor will be affected by a change in the bias on the spring 76 through a screw member 82 positioned in a cover 83 mounted on the base 41 and engaging the adjusting flange 78 of the spring 76. The cover member 83 is secured to the housing or base 41 through screw means 85 which thread through flanges 86 in the cover member and engage threaded hub portions indicated generally at 87 in the base. The cover 83 has also vent or opening at 88 to allow the bleed from the nozzle to vent to atmosphere.

In operation, this rod and the tube sensor will establish a branch line pressure in the conduit 57 in accordance with the input force supplied from the rod and tube sensor 42, 43. Bleed from the nozzle 51 will be vented to atmosphere through the aperture 88 in cover 83 and the flexible plate 65 will move relative to the nozzle 51 in accordance with the input force. The branch line or outlet pressure established in the nozzle section 50 will act on the undersurface of the plate to apply a feedback force in proportion to the area and branch line pressure which will be of a magnitude approaching the input force applied from the sensing device. Thus, the apparatus will be of a force balance type rather than being a position measuring apparatus and will be applicable to high force small motion input signals. The movement of the plate is in the order of thousandths of an inch and although shown in this embodiment as fixed to the base may be suitably pivoted through flexible pivots or free floating as in FIGURES 1 and 2 with the input connections applied thereto. It will be recognized that the input force may be applied to the upper surface of the nozzle to counteract the feedback force directly through suitable linkages and with other types of sensing devices.

In considering this invention it should be remembered that the present disclosure is intended to be illustrative only and the scope of the invention should be determined only by the appended claims.

I claim as my invention:

1. In a pneumatic control device, nozzle means, said nozzle means having a flat lapped annular surface of predetermined diameter, supply conduit means connected to said nozzle means and adapted to be connected to a source of fluid pressure, a restriction positioned in said supply conduit means and having a predetermined diameter, outlet conduit means connected to said last named conduit means between said restriction and the lapped surface of said nozzle, flat valve closure means having a lapped undersurface cooperating with the lapped surface of said nozzle means, means connected to said valve closure means to impart a force thereto in proportion to a condition, the ratio of the diameters of said nozzle means and said restriction means being approximately 150 to 1, said valve closure means being adapted to have a force applied thereto from the pressure in said nozzle means to balance the force applied to said valve closure means by said condition and establish a relationship between said valve closure means and said nozzle means to provide an output pressure in said outlet conduit in proportion to said condition.

2. In a pneumatic control device, nozzle means, said nozzle means having a flat lapped annular surface of predetermined diameter, supply conduit means connected to said nozzle means and adapted to be connected to a source of fluid pressure, a restriction positioned in said supply conduit means and having a predetermined diameter, outlet conduit means connected to said last named conduit means between said restriction and the lapped surface of said nozzle, flat valve closure means having a lapped undersurface cooperating with the lapped surface of said nozzle means, means connected to said valve closure means to impart a force thereto, the ratio of the diameters of said nozzle means and said restriction means being greater than 100 to 1, said valve closure means being adapted to have a force applied thereto opposite to that of said force imparting means from the pressure in said nozzle means to balance the force applied to said valve closure means by said condition and establish a predetermined positional relationship between said valve closure means and said nozzle means to control the pressure in said outlet conduit in proportion to the force of said force imparting means.

3. In a pneumatic control device, nozzle means, said nozzle means having a raised ridge peripheral surface in a single plane and a cross-sectional area within said surface of predetermined magnitude, conduit means connected to a supply of fluid pressure and to said nozzle means, a restriction positioned in said conduit means and having a cross-sectional area of predetermined magnitude, outlet conduit means connected to said conduit means on the downstream side of said restriction, a plate-like closure member positoned over and cooperating with said nozzle means adapted to move relative to said ridge thereon and having a flat lapped cooperating surface with said ridge, means cooperating with said plate-like closure means to impart a force thereto in proportion to a condition, the ratio of the areas of said nozzle means and said restriction being greater than 100 to 1 such that the area under said plate-like closure means is affected by the pressure of the fluid in said nozzle means to apply a forced feedback to said plate-like closure means in proportion to the force applied to said closure means in proportion to the condition and pressure in said nozzle means being varied with the force applied thereto and in proportion to the variation in said condition.

References Cited by the Examiner

UNITED STATES PATENTS

| | | | |
|---|---|---|---|
| 2,898,048 | 8/59 | Stuka | 236—87 |
| 2,914,076 | 11/59 | Zimmerli | 137—85 XR |
| 2,915,078 | 12/59 | Ochs | 137—82 XR |
| 3,055,384 | 9/62 | Puster | 137—85 |

FOREIGN PATENTS

| | | |
|---|---|---|
| 195,202 | 1/58 | Austria. |
| 500,420 | 2/39 | Great Britain. |

WILLIAM F. O'DEA, *Primary Examiner.*

ISADOR WEIL, *Examiner.*